(12) United States Patent
Moriyama et al.

(10) Patent No.: US 10,444,115 B1
(45) Date of Patent: Oct. 15, 2019

(54) TESTING METHOD AND TESTING DEVICE

(71) Applicant: FUJITSU COMPONENT LIMITED, Tokyo (JP)

(72) Inventors: Satoshi Moriyama, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/361,690

(22) Filed: Mar. 22, 2019

(30) Foreign Application Priority Data

Apr. 6, 2018 (JP) ................................. 2018-074105

(51) Int. Cl.
*G01M 11/00* (2006.01)
*G02B 6/30* (2006.01)
*G01M 11/08* (2006.01)
*G02B 6/42* (2006.01)
*G02B 6/38* (2006.01)

(52) U.S. Cl.
CPC .......... *G01M 11/33* (2013.01); *G01M 11/088* (2013.01); *G01M 11/30* (2013.01); *G02B 6/30* (2013.01); *G02B 6/385* (2013.01); *G02B 6/4225* (2013.01)

(58) Field of Classification Search
CPC .... G01M 11/088; G01M 11/30; G01M 11/33; G01M 11/331; G01M 11/332; G01M 11/333; G01M 11/334; G01M 11/335; G01M 11/336; G01M 11/337; G01M 11/338; G01M 11/39; G02B 6/30; G02B 6/3833; G02B 6/385; G02B 6/42; G02B 6/422; G02B 6/4225
See application file for complete search history.

(56) References Cited

U.S. PATENT DOCUMENTS

| | | | | | |
|---|---|---|---|---|---|
| 2,750,912 | A | * | 6/1956 | King | ..................... B21D 39/04 219/221 |
| 5,673,351 | A | * | 9/1997 | Clarke | ................... H04B 10/07 174/68.1 |

(Continued)

FOREIGN PATENT DOCUMENTS

| | | | | | |
|---|---|---|---|---|---|
| JP | 60129637 | A | * | 7/1985 | ............. G01M 11/33 |
| JP | 02212805 | A | * | 8/1990 | ............... G02B 6/30 |

(Continued)

OTHER PUBLICATIONS

Japanese Platform for Patent Information English abstract for Japanese Patent Publication No. 2005-61999, published Mar. 10, 2005.

(Continued)

*Primary Examiner* — Gordon J Stock, Jr.
(74) *Attorney, Agent, or Firm* — Staas & Halsey LLP (57) ABSTRACT

A testing method for testing a jointed condition of a first ferrule holding an edge of an optical waveguide and a second ferrule holding an edge of an optical fiber, includes: dipping the first ferrule and the second ferrule that are jointed to each other into coolant so that the optical waveguide and the optical fiber are optically connected; heating the coolant; cooling the coolant after the heating; inputting a light to one of the optical waveguide and the optical fiber after cooling the coolant, and detecting a light output from the other.

7 Claims, 8 Drawing Sheets

(56) References Cited

U.S. PATENT DOCUMENTS

| | | | |
|---|---|---|---|
| 7,420,665 B2* | 9/2008 | Mueller | G01N 21/0303 356/73.1 |
| 9,933,331 B2* | 4/2018 | Hayashi | G01M 11/33 |
| 2009/0040508 A1* | 2/2009 | Hara | G01M 11/35 356/73.1 |
| 2018/0372961 A1* | 12/2018 | Alkeskjold | G02B 6/3833 |

FOREIGN PATENT DOCUMENTS

| | | | | |
|---|---|---|---|---|
| JP | 2003-42886 | | 2/2003 | |
| JP | 2003270094 A | * | 9/2003 | G01M 11/088 |
| JP | 2005-61999 | | 3/2005 | |

OTHER PUBLICATIONS

Japanese Platform for Patent Information English abstract for Japanese Patent Publication No. 2003-42886, published Feb. 13, 2003.

* cited by examiner

TESTING METHOD AND TESTING DEVICE

CROSS-REFERENCE TO RELATED APPLICATION

This application is based upon and claims the benefit of priority of the prior Japanese Patent Application No. 2018-074105, filed on Apr. 6, 2018, the entire contents of which are incorporated herein by reference.

FIELD

A certain aspect of embodiments described herein relates to a testing method and a testing device.

BACKGROUND

There is developed a technology in which a whole of a device is dipped into liquid coolant and is cooled in order to improve cooling efficiency, regarding a device such as a super computer, a server, a storage or a network component. However, when coolant enters an optical module such as an AOC (Active Optical Cable), optical transmission characteristic of the optical module is degraded.

For example, when coolant enters a space of a jointed portion between ferrules of an optical transceiver, an optical path changes between an edge face of an optical waveguide in one of the ferrules and an edge face of an optical fiber of the other. In this case, optical output is reduced. There is a testing method of leakage using pressure changing on the basis of JISZ2332 of JIS (Japan Industrial Standards), as a testing method of the jointed condition of the ferrules. For example, Japanese Patent Application Publication No. 2005-61999 (hereinafter referred to as Document1) discloses that a SAW device is heated and cooled and leakage is detected.

SUMMARY

In one aspect of the present invention, it is an object to provide a testing method and a testing device that are capable of reducing a time for testing a jointed portion between ferrules.

According to an aspect of the present invention, there is provided a testing method for testing a jointed condition of a first ferrule holding an edge of an optical waveguide and a second ferrule holding an edge of an optical fiber, including: dipping the first ferrule and the second ferrule that are jointed to each other into coolant so that the optical waveguide and the optical fiber are optically connected; heating the coolant; cooling the coolant after the heating; inputting a light to one of the optical waveguide and the optical fiber after cooling the coolant, and detecting a light output from the other.

According to another aspect of the present invention, there is provided a testing device for testing a jointed condition of a first ferrule holding an edge of an optical waveguide and a second ferrule holding an edge of an optical fiber, including; a tank configured to house the first ferrule and the second ferrule which are jointed to each other so that the optical waveguide and the optical fiber are optically connected to each other; a first storage tank configured to store heated coolant; a second storage tank configured to store cooled coolant; a first sender configured to send the coolant heated by the first storage tank, to the tank; and a second sender configured to send the coolant cooled by the second storage tank, to the tank; and a detector configured to detect a light output from one of the optical waveguide and the optical fiber, wherein the first sender sends the heated coolant to the tank so that the first ferrule and the second ferrule are dipped into the heated coolant, wherein the second sender sends the cooled coolant to the tank from the second storage tank so that the first ferrule and the second ferrule are dipped into the cooled coolant after the first ferrule and the second ferrule are dipped into the heated coolant, wherein the detector is configured to detect a light output from one of the optical waveguide and the optical fiber after the first ferrule and the second ferrule are dipped into the cooled coolant.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the testing method of leakage based on JISZ2332, the leakage is detected with use of a value itself of a differential pressure between a standard tank and a tank which houses a DUT (Device Under Test). Therefore, unless a leakage amount is large to some extent, there is a problem that a time for detecting the leakage gets longer. In the method of Document 1, a plurality of devices such as a heating furnace, a liquid tank for testing pressure, a cleaning device or a tester are used. Therefore, a process of the testing method is complicated. Therefore, the time for detecting the leakage gets longer.

Figure 1:
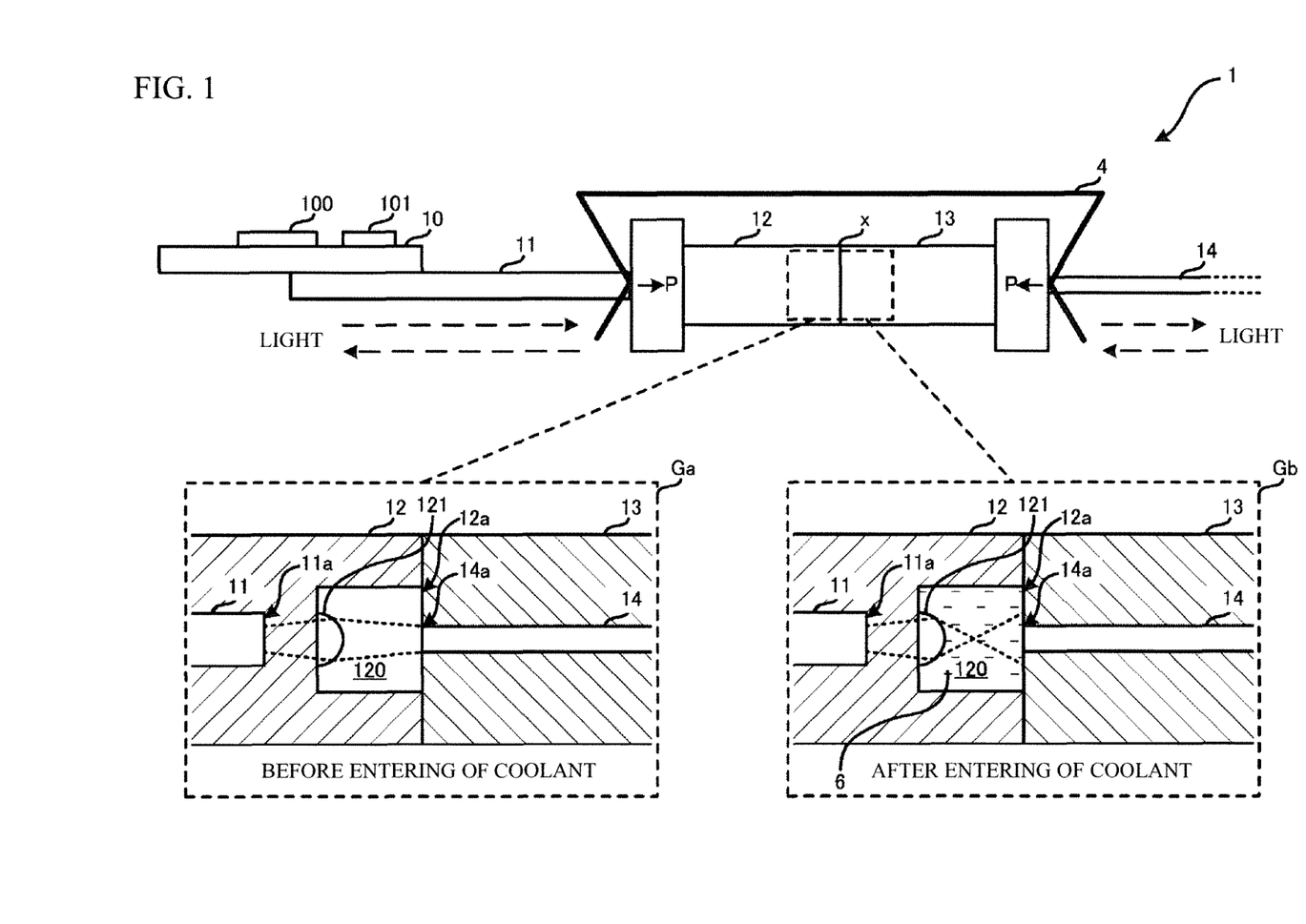
FIG. 1 illustrates a side view of an optical transceiver to be tested.

FIG. 1 illustrates a side view of an example of an optical transceiver 1 to be tested. The optical transceiver 1 is used for a high speed communication process in devices such as a super computer or a server. The optical transceiver 1 sends a light converted from an electrical signal and receives a light converted from an electrical signal. A whole of the optical transceiver 1 is dipped into a coolant in order to improve cooling efficiency. Therefore, the optical transceiver 1 is used under a condition that the optical transceiver is dipped in the coolant.

The optical transceiver 1 has a FPC (Flexible Printed Circuit) 10, a controller IC (Integrated Circuit) 100, an optical element 101, an optical waveguide 11, a ferrule 12 with a lens, a MT (Mechanical Transferable) ferrule 13, an MT clip 4 and an optical fiber 14.

The optical element 101 is an IC mounted on the FPC 10. The optical element 101 has a photoelectric conversion function for converting a light into an electrical signal and an electrooptical conversion function for converting an electrical signal into a light. For example, VCSEL (Vertical Cavity Surface Emitting Laser) performs the photoelectric conversion. For example, a photodiode performs the electrooptical conversion. The optical element 101 is not limited to a single IC. The optical element 101 has an independent IC having the photoelectric conversion function and another independent IC having the electrooptical conversion function. The optical element 101 is an example of an inputting circuit for inputting a light into the optical waveguide 11 and the optical fiber 14.

The optical element 101 is electrically coupled with the optical waveguide 11 and the controller IC 100 via an interconnection of the FPC 10. The optical element 101 converts an electrical signal input from outside into a light and outputs the light to the optical waveguide 11. And the optical element 101 converts a light input from the optical waveguide 11 into an electrical signal and outputs the electrical signal to outside. The controller IC 100 controls the optical element 101 in accordance with an electrical signal input from outside.

For example, the optical waveguide 11 is a flexible sheet made of high polymer. A first end of the optical waveguide 11 is connected to the FPC 10. A second end of the optical waveguide 11 is housed in the ferrule 12 with a lens.

The ferrule 12 with a lens and the MT ferrule 13 are case members which are made of a resin-based material and have a parallelepiped shape. The ferrule 12 with a lens is an example of a first ferrule and holds an end of the optical waveguide 11. The MT ferrule 13 is an example of a second ferrule and holds an end of the optical fiber 14. The end of the optical fiber 14 is housed in the MT ferrule 13.

The ferrule 12 with a lens and the MT ferrule 13 are jointed to each other under condition where the MT clip 4 make an edge face of the ferrule 12 with a lens and an edge face of the MT ferrule 13 face with each other, as indicated by a code "x". The MT clip 4 sandwiches the ferrule 12 with a lens and the MT ferrule 13. The MT clip 4 is a board spring made of a metal. The MT clip 4 presses edge faces of the ferrule 12 with a lens and the MT ferrule 13 opposite to the jointed faces "x", as indicated by a code "p". Thereby, the ferrule 12 with a lens and the MT ferrule 13 are jointed to each other.

The ferrule 12 with a lens and the MT ferrule 13 are jointed with each other so that the optical waveguide 11 and the optical fiber 14 are optically coupled with each other. Therefore, as illustrated with a dotted line, the light having passed through the optical waveguide 11 enters the optical fiber 14 from the jointed portion of the ferrule 12 with a lens and the MT ferrule 13. The light having passed through the optical fiber 14 enters the optical waveguide 11 from the jointed portion of the ferrule 12 with a lens and the MT ferrule 13.

However, when coolant intrudes into an inner portion of the jointed portion of the ferrule 12 with a lens and the MT ferrule 13, optical connection condition between the optical waveguide 11 and the optical fiber 14 is degraded. Therefore, it is not possible to transmit a light between the optical waveguide 11 and the optical fiber 14.

A code "Ga" indicates inside of the jointed portion of the ferrule 12 with a lens and the MT ferrule 13 in a case where the coolant does not intrude into the jointed portion. A concave portion 12a having a cubic shape is formed in the jointed face of the ferrule 12 with a lens. A space 120 is formed between the ferrule 12 with a lens and the MT ferrule 13 that are jointed with each other. The space 120 is filled with air. The space 120 has a size of 2 mm square.

A lens 121 is formed on one of wall faces of the concave portion 12a which faces with an edge face 11a of the optical waveguide 11. The edge face 11a of the optical waveguide 11 faces with an edge face 14a of the optical fiber 14 via the lens 121. The lens 121 is integrally formed with the ferrule 12 with a lens.

In the structure, light entering from the edge face 11a of the optical waveguide 11 enters the lens 121 as illustrated with a dotted line. The light emitted from the lens 121 refracts because of a difference between refraction indices of the resin and the air and enters the edge face 14a of the optical fiber 14. In this manner, the light enters the optical fiber 14 from the optical waveguide 11. Similarly, the light enters the optical waveguide 11 from the optical fiber 14.

A code "Gb" indicates an inner side of the jointed portion between the ferrule 12 with a lens and the MT ferrule 13 in a case where coolant 6 intrudes into the jointed portion. When accuracy of the jointed portion between the ferrule 12 with a lens and the MT ferrule 13 is bad, the coolant 6 intrudes into the space 120 from a gap of the jointed portion. Therefore, the refraction index of the space 120 fluctuates.

Therefore, the light emitted from the lens 121 refracts with an angle different from an angle of a case where the coolant 6 does not intrude, as illustrated with a dotted line. Thereby, the light cannot enter the edge face 14a of the optical fiber 14. Thus, loss of the light increases. It is therefore not possible to normally transmit the light between the optical fiber 14 and the optical waveguide 11.

And so, the jointed condition of the ferrule 12 with a lens and the MT ferrule 13 is tested during manufacturing of the optical transceiver 1.

Figure 2:
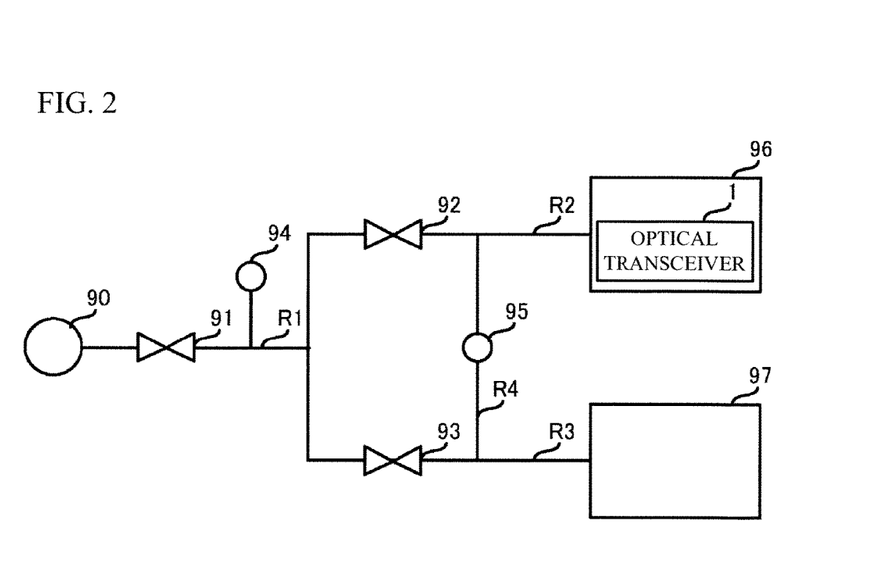
FIG. 2 illustrates a structure of a testing device of a comparative embodiment.

FIG. 2 illustrates a structure of a testing device of a comparative embodiment. As an example, the testing device has a structure for performing leakage test based on JISZ2332. The testing device has a pump 90, valves 91 to 93, a pressure meter 94, a differential pressure meter 95, a DUT tank 96, a standard tank 97 and pipes R1 to R4.

The pump 90 is a vacuum pump or a pressure pump. The pump 90 is connected with a first end of a pipe R1. The valve 91 and the pressure meter 94 are connected with an intermediate of the pipe R1. A second end of the pipe R1 is branched into pipes R2 and R3.

The DUT tank 96 is connected to an end of the pipe R2. The DUT tank 96 houses the optical transceiver 1 which acts as a DUT. The standard tank 97 is connected to an end of the pipe R3. The standard tank 97 gives a standard pressure value to the DUT tank 96.

The valve 92 is connected to an intermediate of the pipe R2. The valve 93 is connected to an intermediate of the pipe R3. The pipe R4 connects a portion of the pipe R2 between the valve 92 and the DUT tank 96 to a portion of the pipe R3 between the valve 93 and the standard tank 97. The differential pressure meter 95 is connected to an intermediate of the pipe R4. A description will be given of a testing method using the testing device of the comparative embodiment.

First, the DUT tank 96 houses the optical transceiver 1. Next, the valves 91 to 93 are opened. Then, the pump 90 starts. Next, when the pressure meter 94 indicates a standard value, the valve 91 is closed. Then, the valves 92 and 93 are closed. Thus, pressures of the DUT tank 96 and the standard tank 97 become standard values.

When the jointed condition of the ferrule 12 with a lens and the MT ferrule 13 of the optical transceiver 1 is bad, air gradually leaks from the space 120. In this case, the pressure of in the DUT tank 96 is reduced. Therefore, a differential pressure occurs between the DUT tank 96 and the standard tank 97. Thereby, the optical transceiver 1 in the DUT tank 96 is determined as a bad product when the pressure value of the differential pressure meter 95 exceeds a threshold after a predetermined time passes after the closing of the valves 92 and 93. Otherwise, the optical transceiver 1 is determined as a good product.

However, in the testing method, leak is detected from the differential pressure value itself. In this case, there is a problem that it takes a long time to detect the leak unless a leak amount is much to some extent. And so, in a testing method of the following embodiment, the leak is detected by reducing the temperature of the coolant under a condition that the optical transceiver 1 is dripped into the coolant, and contracting the air in the space 120

Figure 3:
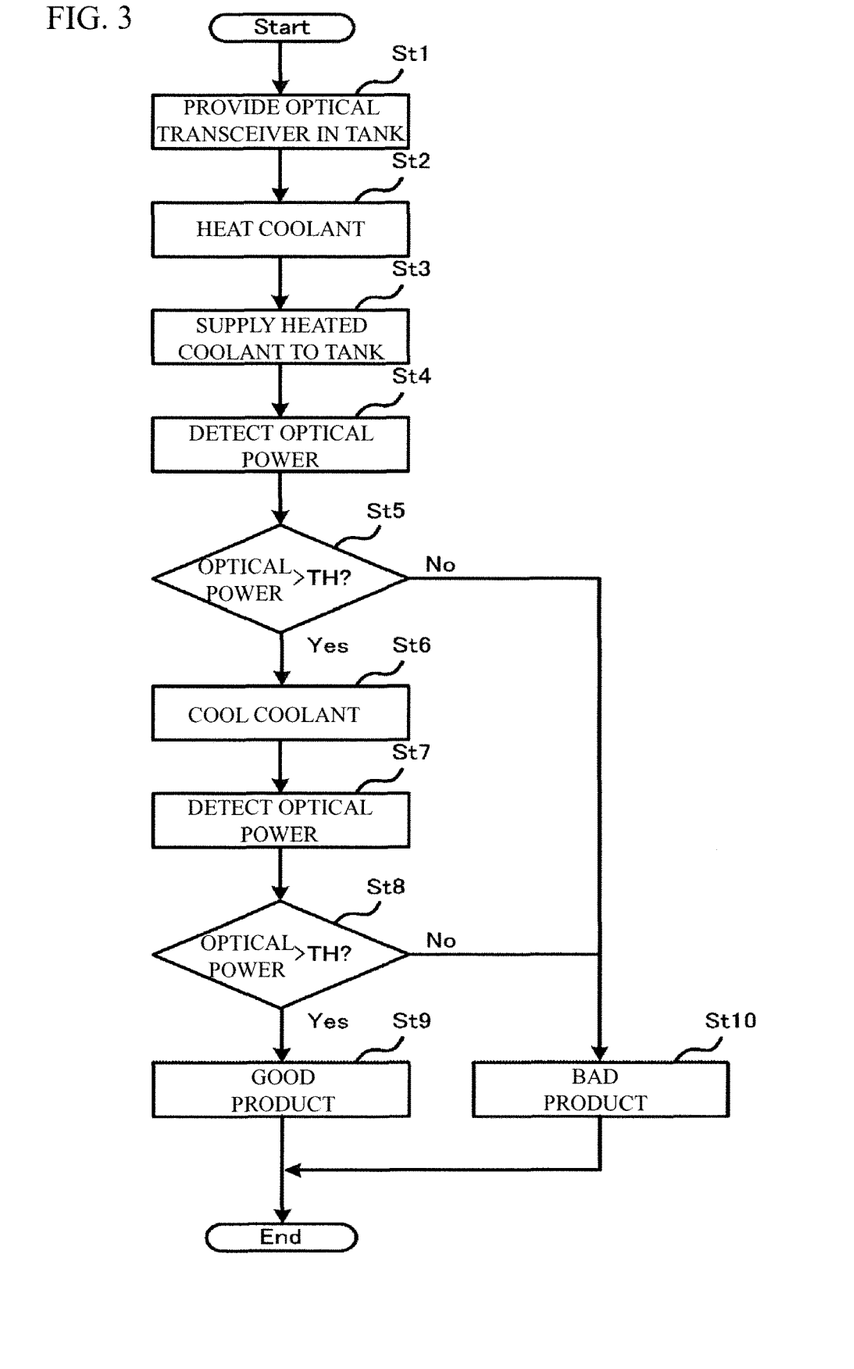
FIG. 3 illustrates a flowchart of a testing method of an embodiment.
Figure 4:
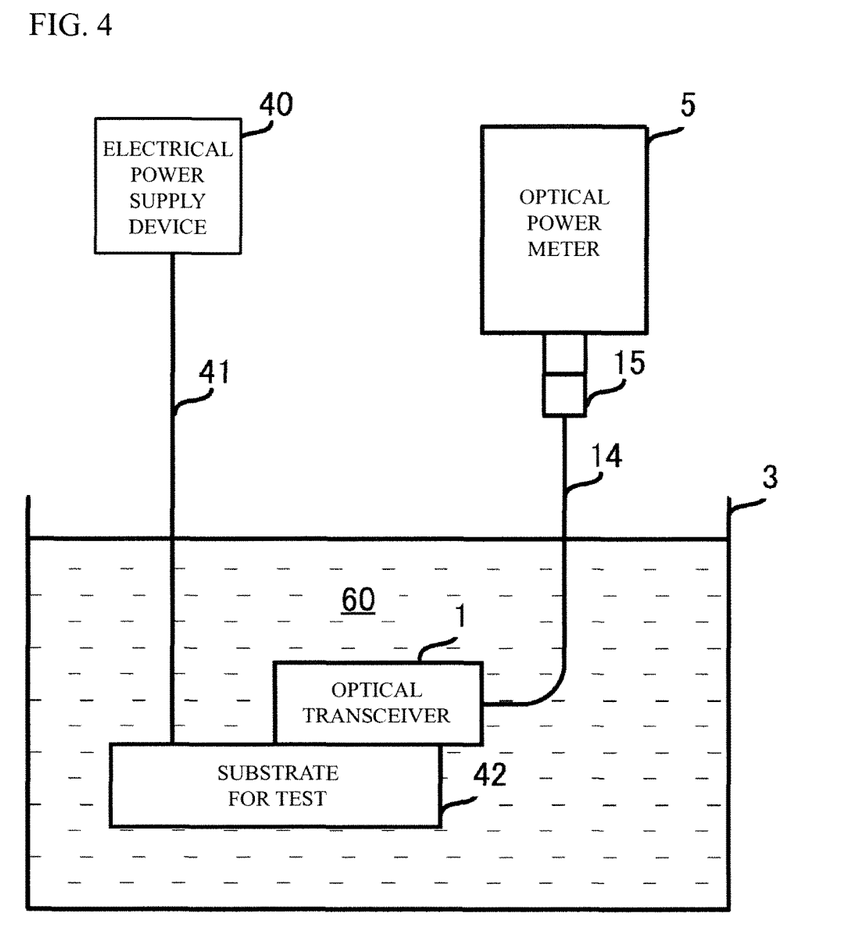
FIG. 4 illustrates a testing method of an embodiment.

FIG. 3 illustrates a flowchart of the testing method of the embodiment. FIG. 4 illustrates an example of the testing method. In FIG. 4, the same numerals are added to the same structure as FIG. 1. An explanation of the same structure is omitted.

An inspector puts the optical transceiver 1 in a test tank 3 that is capable of storing coolant 60 (St1). The optical transceiver 1 is electrically coupled with a substrate 42 for test that is connected with an electrical power supply device 40 via an electrical power supply cable 41. The optical fiber 14 is connected to the optical power meter 5 via a connector 15 of a front end.

The electrical power supply device 40 supplies electrical power to the optical transceiver 1 via the electrical power supply cable 41 and the substrate 42 for test. The substrate 42 for test converts the voltage of the electrical power supply device 40 into an operation voltage of the optical transceiver 1. The substrate 42 for test outputs a control signal for making the optical transceiver 1 output a light. With the structure, the optical power meter 5 can detect the optical power output by the optical transceiver 1. The substrate 42 for test is provided in the test tank 3 together with the optical transceiver 1. However, the substrate 42 for test may be provided outside of the test tank 3.

Next, the inspector heats the coolant 60 outside of the test tank 3 (St2). And the inspector provides the heated coolant 60 into the test tank 3(St3). The optical transceiver 1 is dripped in the heated coolant 60. Therefore, the air in the space 120 of the jointed portion between the ferrule 12 with a lens and the MT ferrule 13 is heated and is expanded.

The coolant 60 is heated to approximately 70 degrees C. A heating means of the coolant 60 is such as a heater. However, the structure is not limited. An injection means of the coolant 60 is such as a pump. However, the structure is not limited.

Fluorine-based inert liquid is used as the coolant 60. However, the structure is not limited. Inert gas may be used as the coolant 60. It is preferable that the coolant 60 is a material into which the optical transceiver 1 is dipped under a usage condition so that the test is performed under a condition near an actual usage condition.

Next, the inspector turns on the switch of the electrical power supply device 40 and detects optical power (dB) output from the optical transceiver 1 with use of the optical power meter 5 (St4). Thus, the light is input from the optical waveguide 11 and is output from the optical fiber 14. For example, when a large crack exits in the jointed portion between the ferrule 12 with a lens and the MT ferrule 13, the coolant 60 enters the space 120 from the crack when the coolant 60 is injected into the test tank 3. Therefore, a light with a normal power is not output from the optical fiber 14.

Therefore, the inspector determines the optical transceiver 1 as a bad product (St 10), when the optical power is the threshold TH or less (No in St5). And, the inspector finishes the test. After the detection of the optical power, the electrical power supply device 40 is turned off. However, the electrical power supply device 40 may be on during the test.

The inspector cools the coolant 60 (St6), when the optical power exceeds the threshold TH (Yes in St5). The means for cooling the coolant 60 is cooling the coolant 60 by putting the test tank 3 in an environment of a room temperature. However, cooling devices described later may be used. The coolant 60 is cooled to a room temperature (for example 25 degrees C.).

The optical transceiver 1 is cooled when the temperature of the coolant 60 around the optical transceiver 1 is reduced. Therefore, the air in the space 120 of the jointed portion between the ferrule 12 with a lens and the MT ferrule 13 is cooled and is contracted. Therefore, a differential pressure occurs between the air in the space 120 and the coolant 60 outside of the space 120.

Next, the inspector turns on the switch of the electrical power supply device 40, and detects the optical power output from the optical transceiver 1 with use of the optical power meter 5 (St7). For example, when a slight amount of crack exists in the jointed portion between the ferrule 12 with a lens and the MT ferrule 13, the coolant 60 enters the space 120 from the crack because of the differential pressure. Therefore, a light with a normal power is not output from the optical fiber 14.

Therefore, the inspector determines the optical transceiver 1 as a bad product (St10) and finishes the test, when the optical power is the threshold TH or less (No in St8). The inspector determines the optical transceiver 1 as a good product (St9) and finishes the test, when the optical power exceeds the threshold TH (Yes in St8). In this manner, the test is performed.

In the testing method of the embodiment, when the optical transceiver 1 is dipped into the heated coolant 60 and the coolant 60 is cooled, a differential pressure occurs between the space 120 and the coolant 60. In this case, when the jointed portion is bad, the coolant 60 rapidly enters the space 120. When the coolant 60 enters the space 120, the optical connection condition between the optical waveguide 11 and the optical fiber 14 is degraded. In this case, a light of normal power is not output from the optical transceiver 1.

It is therefore possible to determine good or bad of the jointed portion between the ferrule 12 with a lens and the MT ferrule 13, by detecting a light which is input from the optical waveguide 11 and is output from the optical fiber 14 after cooling the coolant 60.

Therefore, being different from the comparative example, in the testing method of the embodiment, the good or bad of the jointed condition is determined with use of not the differential pressure itself between the space 120 and the coolant 60 in the jointed portion between the ferrule 12 with a lens and the MT ferrule 13 but the optical power value caused by the coolant 60 entering the space 120 in accordance with the differential pressure. Therefore, the test time is shorter than that of the comparative example. In the testing method of the embodiment, the pressure in the space 120 is controlled by heating or cooling of the coolant 60. Therefore, the process is more simplified than that of Document 1. And, the test time becomes shorter than that of Document 1.

In the testing method, the process of heating the coolant 60 (St2) is performed before dipping the optical transceiver 1 in the coolant 60 (St3). Therefore, it is possible to rapidly increase the pressure in the space 120 by dipping the optical transceiver 1 in the coolant 60 which is heated in advance. Accordingly, for example, the jointed portion between the ferrule 12 with a lens and the MT ferrule 13 is subjected to strong stress. Thereby, it is easier for the coolant 60 to enter the space 120.

In the test method, before the cooling process of the coolant 60 (St6), the light input from the optical waveguide 11 and output from the optical fiber 14 is detected (St4). Therefore, as mentioned above, when a large crack exists in the jointed portion between the ferrule 12 with a lens and the MT ferrule 13, it is possible to determine the bad product without cooling the coolant 60.

In the testing method, the whole of the optical transceiver 1 is dipped in the coolant 60 in St1. Therefore, the optical element 101 is dipped into the coolant 60. Therefore, when abnormality occurs in the optical element 101 in the heating of the coolant 60 (St2) or cooling of the coolant 60 (St6), it is possible to determine the optical transceiver 1 as a bad product (St10) in the detecting process of the optical power (St4, St7). That is, it is possible to detect the temperature characteristic of the optical element 101. Of course, only the jointed portion between the ferrule 12 with a lens and the MT ferrule 13 may be dipped into the coolant 60.

In the testing method of the embodiment, the optical power is detected in St4 and St7. The object to be detected is not limited to the optical power. Another optical characteristic of a light output from the optical transceiver 1 may be detected. For example, in St4 and St7, a pulse mask of a light may be detected with use of an optical oscilloscope, and good or bad of the pulse mask may be determined in St5 and St8.

In the testing method of the embodiment, good or bad of the optical transceiver 1 is determined (St5 and St8) by detecting the light output from the optical transceiver 1 (St4 and St7). However, good or bad may be determined by detecting the light input into the optical transceiver 1. In this case, a light source emitting a light is connected to the connector 15 at an edge of the optical fiber 14. The light is input from the optical fiber 14 in the jointed portion between the ferrule 12 with a lens and the MT ferrule 13 and is output from the optical waveguide 11. The substrate 42 for test has a function for determining whether the optical transceiver 1 normally receives a light from an electrical signal input from the optical element 101. That is, the substrate 42 for test detects the light output from the optical fiber 14.

In the testing method of the embodiment, the cooling process of the coolant 60 (St6) is performed by cooling the heated coolant 60. However, the method it not limited. For example, as described in the following description, it is possible to cool the coolant 60 with use of a cooling device.

Figure 5:
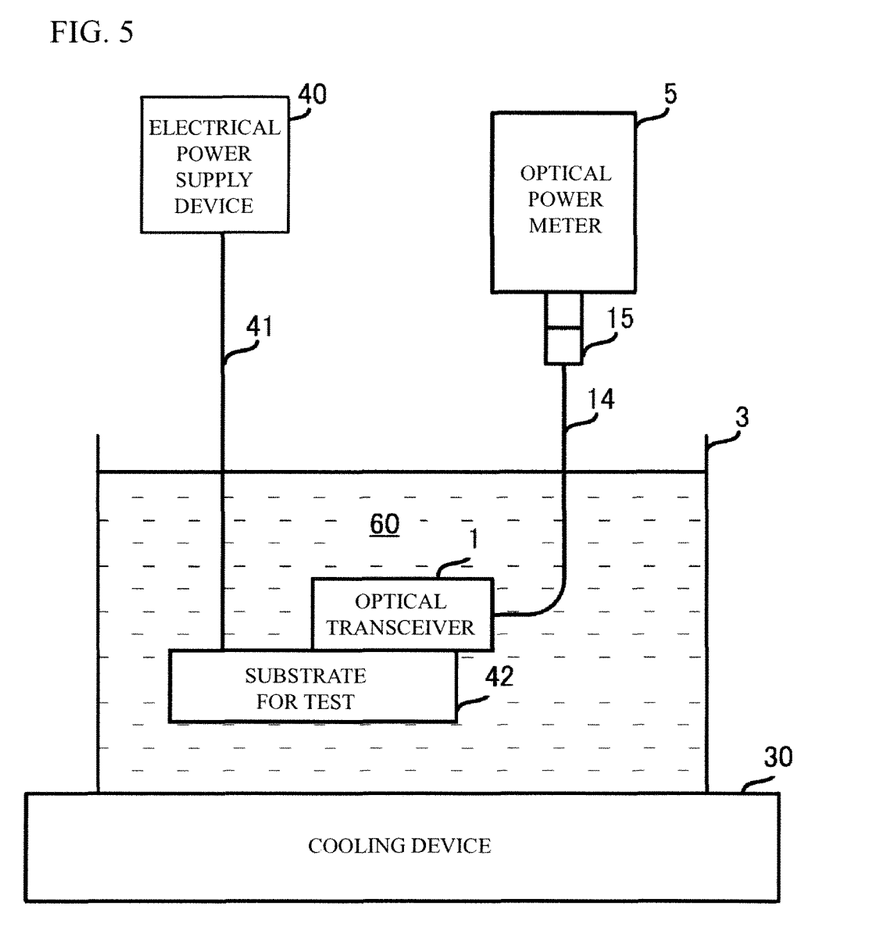
FIG. 5 illustrates another testing method of an embodiment.

FIG. 5 illustrates another example of the testing method of the embodiment.

In FIG. 5, the same numerals are added to the same structures as FIG. 4. An explanation of the same structure is omitted.

In the test tank 3, the cooling device 30 including a peltier element or a heat pump is provided. The cooling device 30 cools the coolant 60.

In the testing method of the embodiment, the peltier element or the heat pump cools the coolant 60 in the cooling process of the coolant 60 (St6). Therefore, the time for cooling the coolant 60 is reduced.

Figure 6:
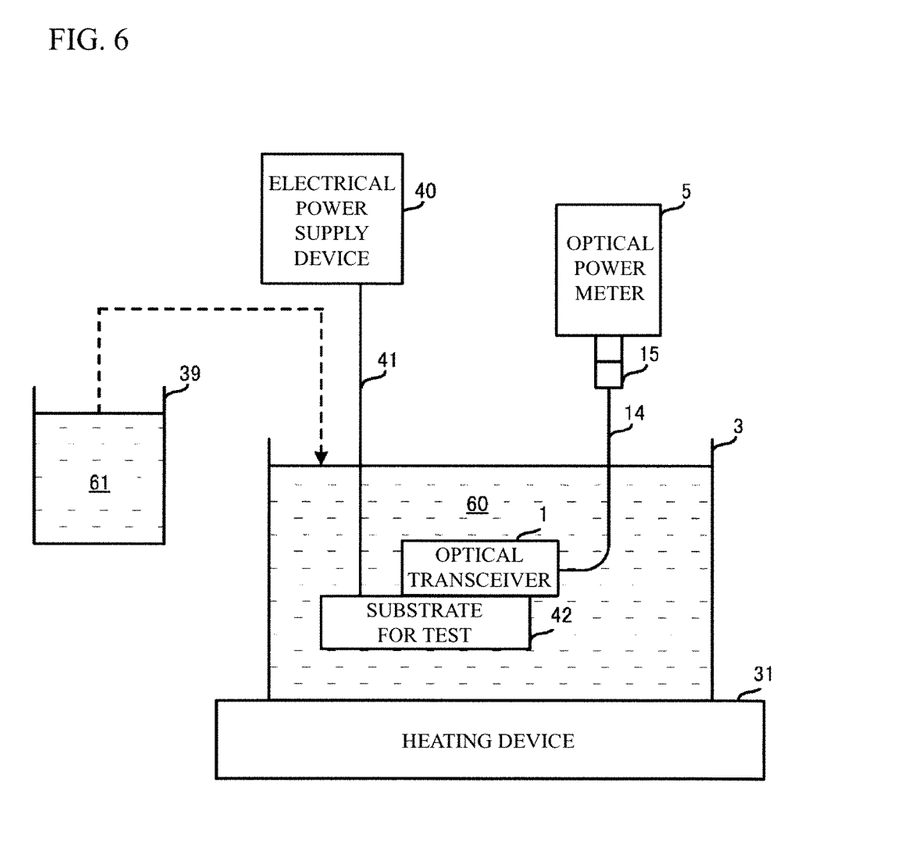
FIG. 6 illustrates another testing method of an embodiment.

It is possible to perform the cooling process of the coolant 60 (St6), by mixing another cooled coolant with the coolant 60 in the test tank 3, as described in the following description.

FIG. 6 illustrates another example of the testing method of the embodiment. In FIG. 6, the same numerals are added to the same structures as those of FIG. 4. An explanation of the same structures is omitted.

The test tank 3 has a heating device 31 including a peltier element, a heat pump or a hot plate. The heating device 31 performs the heating process of the coolant 60 (St2) after the injection process of the coolant 60 into the test tank 3 (St3). The coolant 60 in the test tank 3 is heated by the peltier element, the heat pump or the hot plate. Therefore, the time for heating the coolant 60 is reduced.

In the testing method of the embodiment, another coolant 61 of which a temperature is lower than that of the coolant 60 in the test tank 3 is mixed with the coolant 60 in the test tank 3 as indicated by an arrow, and the coolant 60 is cooled, in the cooling process of the coolant 60 (St6). Therefore, the time for cooling the coolant 60 is reduced. The coolant 61 is cooled by a cooling means such as the peltier element or the heat pump, under a condition the coolant 61 is stored in another container 39 before being injected into the test tank 3. It is preferable that the type of the coolant 61 is the same as that of the coolant 60 stored in the test tank 3.

Next, a description will be given of a testing device of the embodiment.

Figure 7:
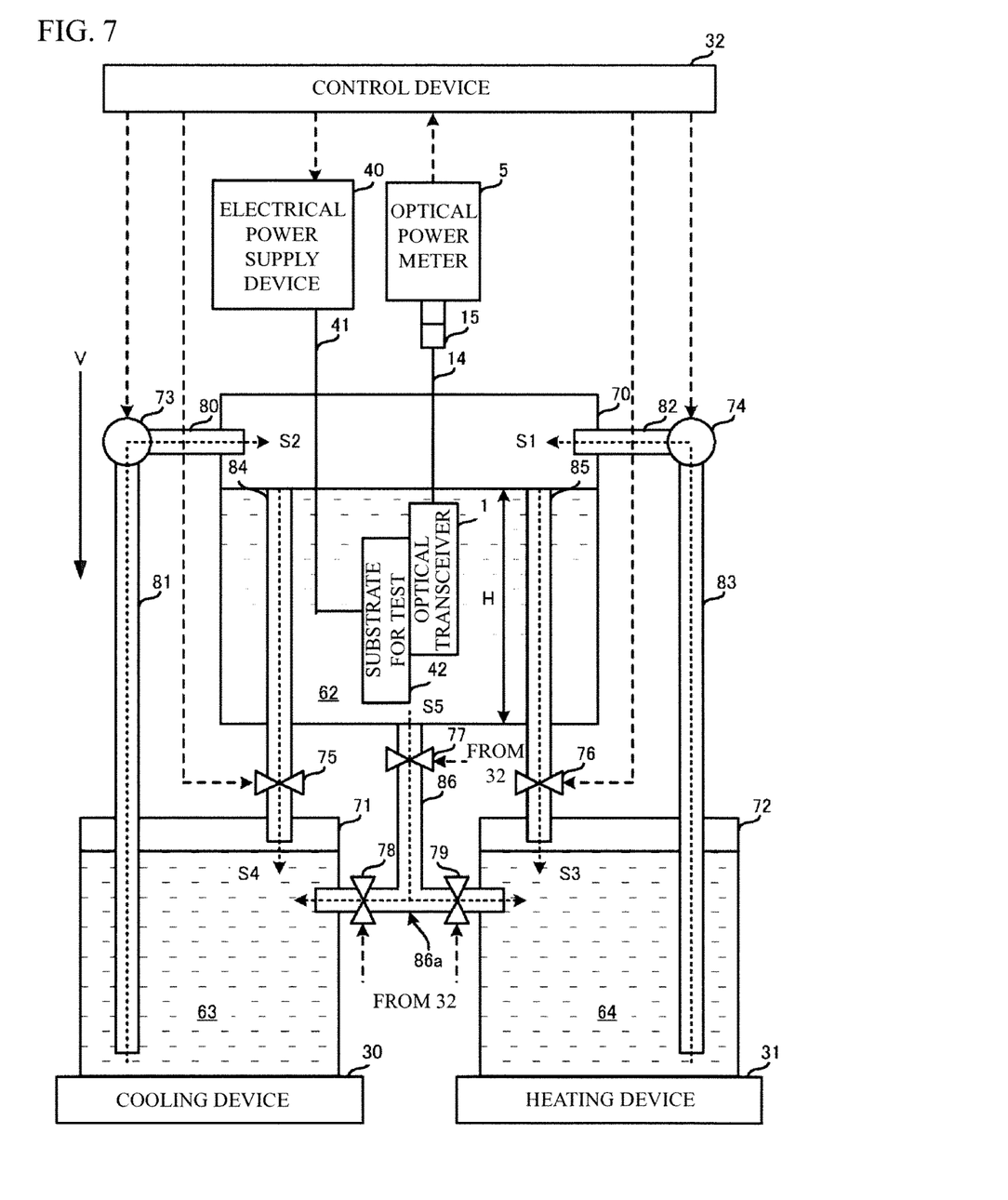
FIG. 7 illustrates a structure of a testing device of an embodiment.

FIG. 7 illustrates a structure of the testing device of the embodiment. In FIG. 7, the same numerals are added to the same structures as those of FIG. 1. An explanation of the structures is omitted. The testing device tests the jointed condition of the ferrule 12 with a lens and the MT ferrule 13.

The testing device has an optical power meter 5, a cooling device 30, the heating device 31, a control device 32, the electrical power supply device 40, a tank 70, a cooling tank 71, a heating tank 72, a lower temperature side pump 73, a higher temperature side pump 74, a lower temperature side circulation valve 75, a higher temperature side circulation valve 76, an exhaust valve 77, a lower temperature side exhaust valve 78, and a higher temperature side exhaust valve 79. The optical power meter 5 detects a light output from the optical transceiver 1, as mentioned above.

The testing device has higher temperature side supply paths 82 and 83, lower temperature side supply paths 80 and 81, a lower temperature side circulation path 84, a higher temperature side circulation path 85, and an exhaust path 86. FIG. 7 illustrates a side view of the tank 70, the cooling tank 71, the heating tank 72, the higher temperature side supply paths 82 and 83, the lower temperature side supply paths 80 and 81, the lower temperature side circulation path 84, the higher temperature side circulation path 85 and the exhaust path 86, with respect to a vertical direction V.

The tank 70 houses the optical transceiver 1. Heated coolant 64 is stored in the heating tank 72. Cooled coolant 63 is stored in the cooling tank 71. The heating tank 72 is an example of a first storage tank. The cooling tank 71 is an example of a second storage tank. The coolant 63 and the coolant 64 are such as fluorine-based inert liquid. The coolant 63 and the coolant 64 are not limited to the liquid. The coolant 63 and the coolant 64 may be inert gas. It is preferable that the type of the coolant 63 is the same as that of the coolant 64.

The heating device 31 for heating the coolant 64 is provided in the heating tank 72. The heating tank 72 is connected to the higher temperature side pump 74 via a higher temperature side supply path 83. The higher temperature side pump 74 is connected to the tank 70 via a higher temperature side supply path 82. The higher temperature side pump 74 absorbs the coolant 64 via the higher temperature side supply path 83 from the heating tank 72 as indicated by an arrow S1, and sends the coolant 64 to the tank 70 via the higher temperature side supply path 82. The higher temperature side pump 74 is an example of a first sender.

The cooling device 30 for cooling the coolant 63 is provided in the cooling tank 71. The cooling tank 71 is connected to the lower temperature side pump 73 via a lower temperature side supply path 81. The lower temperature side pump 73 is connected to the tank 70 via a lower temperature side supply path 80. The lower temperature side pump 73 absorbs the coolant 63 via the lower temperature side supply path 81 from the cooling tank 71, as indicated by an arrow S2, and sends the coolant 63 to the tank 70 via the lower temperature side supply path 80. The lower temperature side pump 73 is an example of a second sender.

The optical transceiver 1 and the substrate 42 for test in the tank 70 are dipped into coolant 62 sent to the tank 70 from the heating tank 72 or the cooling tank 71. An outlet of the higher temperature side supply path 82 and an outlet of the lower temperature side supply path 80 are exposed to the tank 70, at an upper position of the tank 70 in the vertical direction V. The coolant 64 heated by the heating device 31 is supplied from the higher temperature side supply path 82. The coolant 63 cooled by the cooling device 30 is supplied from the lower temperature side supply path 80.

The lower temperature side circulation path 84 and the higher temperature side circulation path 85 extend in a vertical direction V (downward) in the tank 70. The lower temperature side circulation path 84 and the higher temperature side circulation path 85 have an inlet at a height H from the bottom of the tank 70. The position of the height H is upper than the optical transceiver 1 and the substrate 42 for test in the vertical direction V. The lower temperature side circulation path 84 and the higher temperature side circulation path 85 penetrate the bottom of the tank 70 and are connected to the cooling tank 71 and the heating tank 72.

An outlet of the lower temperature side circulation path 84 is exposed to an upper portion of the cooling tank 71 in the vertical direction V. An outlet of the higher temperature side circulation path 85 is exposed to an upper portion of the heating tank 72 in the vertical direction V. The lower temperature side circulation path 84 has a lower temperature side circulation valve 75 between the tank 70 and the cooling tank 71. The higher temperature side circulation path 85 has a higher temperature side circulation valve 76 between the tank 70 and the heating tank 72.

When the lower temperature side circulation valve 75 is opened, the coolant 62 in the tank 70 is exhausted to the cooling tank 71 from the lower temperature side circulation path 84 so that an upper face of the coolant 62 in the tank 70 does not exceed the height H in the vertical direction V (indicated by an arrow S4). Thus, the coolant 62 and the coolant 63 circulate between the tank 70 and the cooling tank 71.

When the higher temperature side circulation valve 76 is opened, the coolant 62 in the tank 70 is exhausted from the higher temperature side circulation path 85 to the heating tank 72 so that an upper face of the coolant 62 in the tank 70 does not exceed the height H in the vertical direction V (indicated by an arrow S3). Thus, the coolant 62 and the coolant 64 circulate between the tank 70 and the heating tank 72.

The bottom of the tank 70 in the vertical direction V has an inlet of the exhaust path 86 for exhausting the coolant 62 from the tank 70. The exhaust path 86 has a T-shape and is branched toward the cooling tank 71 and the heating tank 72 from the tank 70. Outlets of the exhaust path 86 are respectively exposed to a side portion of the cooling tank 71 and a side portion of the heating tank 72. The exhaust path 86 has the exhaust valve 77 between the tank 70 and a branching portion 86a. The exhaust path 86 has a lower temperature side exhaust valve 78 between the cooling tank 71 and the branching portion 86a. The exhaust path 86 has a higher temperature side exhaust valve 79 between the heating tank 72 and the branching portion 86a.

When the exhaust valve 77 and the lower temperature side exhaust valve 78 are opened, the coolant 62 in the tank 70 is exhausted to the cooling tank 71. When the exhaust valve 77 and the higher temperature side exhaust valve 79 are opened, the coolant 62 in the tank 70 is exhausted to the heating tank 72 (indicate by an arrow S5).

The control device 32 is a computer device such as a personal computer or a server. The control device 32 controls an operation of the testing device when a processor such as a CPU (Central Processing Unit) operates in accordance with a program stored in a memory. The control device 32 is electrically coupled with the optical power meter 5, the electrical power supply device 40, the lower temperature side pump 73, the higher temperature side pump 74, the lower temperature side circulation valve 75, the higher temperature side circulation valve 76, the exhaust valve 77, the lower temperature side exhaust valve 78, and the higher temperature side exhaust valve 79. A description will be given of an operation of the testing device.

Figure 8:
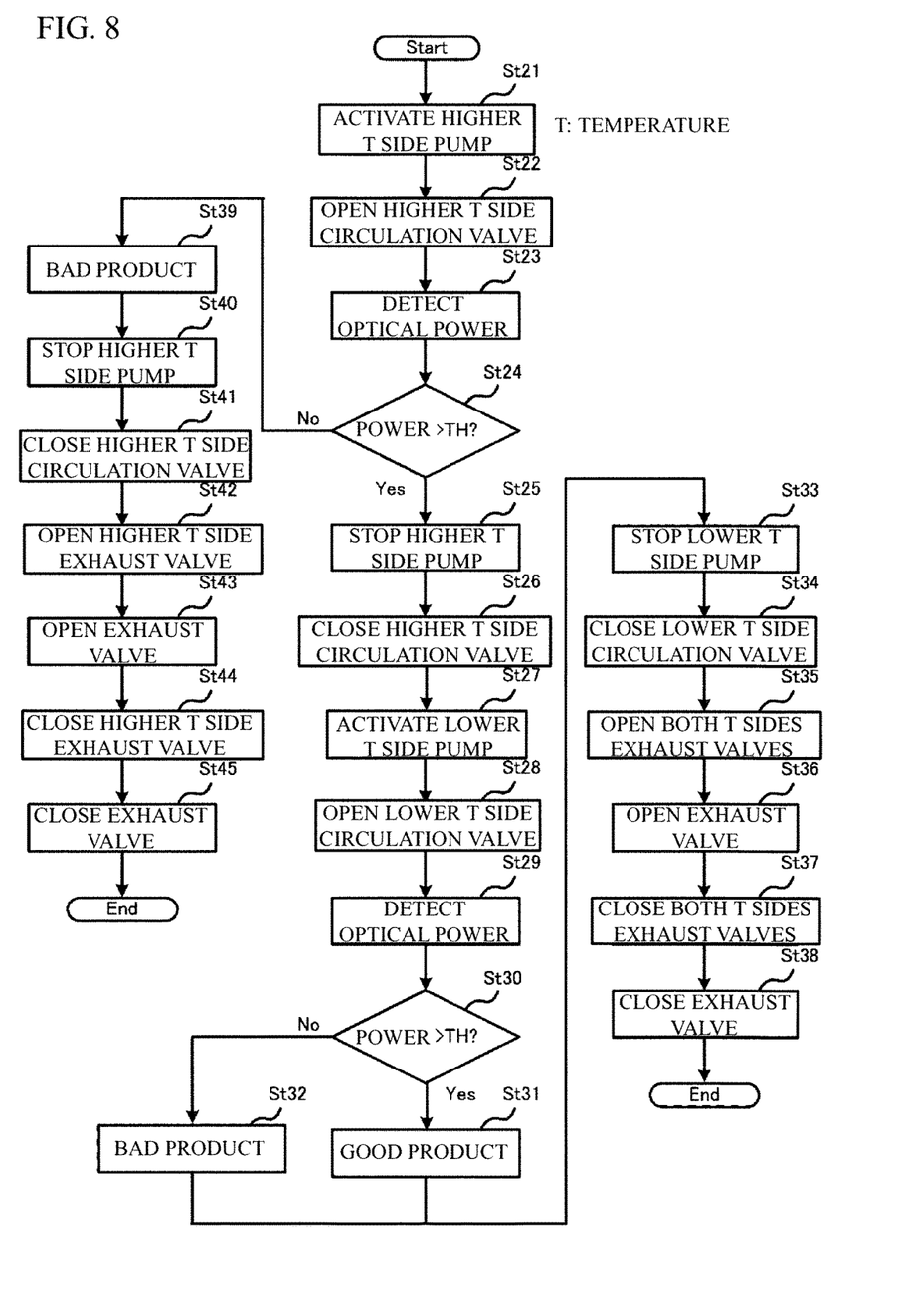
FIG. 8 illustrates a flowchart of an operation of a testing device.

FIG. 8 illustrates a flowchart of an example of the operation of the testing device. The control device 32 activates the higher temperature side pump 74 (St21), and opens the higher temperature side circulation valve 76 (St22). Thereby, the higher temperature side pump 74 sends the heated coolant 64 in the heating tank 72 to the tank 70. In this case, the coolant 62 in the tank 70 reaches the height H. Therefore, the optical transceiver 1 and the substrate 42 for test are dipped into the coolant 62. That is, the higher temperature side pump 74 sends the coolant 64 to the tank 70 so that the optical transceiver 1 is dipped into the heated coolant 64.

Thus, the air in the space 120 of the jointed portion of the ferrule 12 with a lens and the MT ferrule 13 is heated and expands.

Next, the control device 32 turns on the switch of the electrical power supply device 40 and detects the optical power output from the optical transceiver 1 with use of the optical power meter 5 (St23). Thereby, a light enters the optical waveguide 11 and is output from the optical fiber 14. And, the optical power meter 5 detects the light output from the optical fiber 14. For example, in a case where there is a large crack in the jointed portion of the ferrule 12 with a lens and the MT ferrule 13, the coolant 62 enters the space 120 from the crack at a time when the coolant 62 is injected into the tank 70. Therefore, a light having normal power is not output from the optical fiber 14.

Therefore, when the optical power is a predetermined threshold TH or less (No in St24), the control device 32 determines the optical transceiver 1 as a bad product (St39). Next, the control device 32 stops the higher temperature side pump 74 (St40), and closes the higher temperature side circulation valve 76 (St41). Thus, the higher temperature side pump 74 stops sending the coolant 64.

Next, the control device 32 opens the higher temperature side exhaust valve 79 (St42), and opens the exhaust valve 77 (St43). Therefore, the coolant 62 in the tank 70 is exhausted to the heating tank 72. Thereby, the coolant 62 in the tank 70 is re-collected to the heating tank 72. Next, the control device 32 closes the higher temperature side exhaust valve 79 (St44), closes the exhaust valve 77 (St45), and stops the operation thereof.

When the optical power exceeds the threshold TH (Yes in St24), the control device 32 stops the higher temperature side pump 74 (St25) and closes the higher temperature side circulation valve 76 (St26). Thereby, the higher temperature side pump 74 stops sending the coolant 64.

Next, the control device 32 activates the lower temperature side pump 73 (St27), and opens the lower temperature side circulation valve 75 (St28). Thereby, the lower temperature side pump 73 sends the cooled coolant 63 stored in the cooling tank 71 to the tank 70. And, the coolant 62 in the tank 70 reaches the height H. Therefore, the optical transceiver 1 and the substrate 42 for test are dipped into the coolant 62. That is, the lower temperature side pump 73 sends the coolant 63 to the tank 70 so that the optical transceiver 1 is dipped into the heated coolant 63.

In this case, the coolant 62 that is stored in the tank 70 before the cooled coolant 63, that is the heated coolant 64, moves to the upper portion of the tank 70 by heat convection and is exhausted from the lower temperature side circulation path 84 to the cooling tank 71. The heated coolant 64 moves to the upper portion of the cooling tank 71 in the vertical direction V by heat convection. An inlet of the lower temperature side supply path 80 extending from the lower temperature side pump 73 opens near the bottom portion of the cooling tank 71 in the vertical direction V. Therefore, the heated coolant 64 does not return to the tank 70.

The optical transceiver 1 is cooled when the temperature of the coolant 62 in the tank 70 is reduced. In this case, the air in the space 120 of the jointed portion of the ferrule 12 with a lens and the MT ferrule 13 is cooled and contracts. Therefore, a differential pressure occurs between the air in the space 120 and the coolant 62 of outside.

Next, the control device 32 turns on the switch of the electrical power supply device 40 and detects the optical power output from the optical transceiver 1 with use of the optical power meter 5 (St29). In this case, the optical power meter 5 detects a light output from the optical fiber 14. For example, when there is a slight crack in the jointed portion of the ferrule 12 with a lens and the MT ferrule 13, the coolant 62 enters the space 120 of the jointed portion from the crack because of the differential pressure. Therefore, a light with normal power is not output from the optical fiber 14.

Therefore, when the optical power is the threshold TH or less (No in St30), the control device 32 determines the optical transceiver 1 as a bad product (St32). When the optical power exceeds the threshold TH (Yes in St30), the control device 32 determines the optical transceiver 1 as a good product (St31).

Next, the control device 32 stops the lower temperature side pump 73 (St33), and closes the lower temperature side circulation valve 75 (St34). Thus, the lower temperature side pump 73 stops sending of the coolant 63.

Next, the control device 32 opens the lower temperature side exhaust valve 78 and the higher temperature side exhaust valve 79 (St35), and opens the exhaust valve 77 (St36). Therefore, the coolant 62 in the tank 70 is exhausted to the cooling tank 71 and the heating tank 72. In this case, the control device 32 can adjust the amount of the coolant 62 exhausted to the cooling tank 71 and the amount of the coolant 62 exhausted to the heating tank 72, by adjusting an opening angle of the lower temperature side exhaust valve 78 and the higher temperature side exhaust valve 79.

Next, the control device 32 closes the lower temperature side exhaust valve 78 and the higher temperature side exhaust valve 79 (St37) and closes the exhaust valve 77 (St38). In this manner, the testing device operates.

In the testing device of the embodiment, the optical transceiver 1 is dipped into the heated coolant 64. After that, the optical transceiver 1 is dipped into the cooled coolant 63. Therefore, a differential pressure occurs between the space 120 of the jointed portion of the ferrule 12 with a lens and the MT ferrule 13, and the coolant 62 stored in the tank 70. In this case, when the jointed portion is bad, the coolant 60 rapidly enters the space 120. When the coolant 62 enters the space 120, an optical connection condition between the optical waveguide 11 and the optical fiber 14 is degraded. Therefore, a light with normal power is not output from the optical transceiver 1.

Therefore, after the optical transceiver 1 is dipped into the cooled coolant 63, the control device 32 can determine whether the jointed condition of the ferrule 12 with a lens and the MT ferrule 13 is good or bad, by detecting the light which enters the optical waveguide 11 and is output from the optical fiber 14. Therefore, with the testing device of the embodiment, the time for the test is reduced as well as the above-mentioned testing method.

In the testing device of the embodiment, before the optical transceiver 1 is dipped into the cooled coolant 63, the optical power meter 5 detects the light which enters the optical waveguide 11 and is output from the optical fiber 14. Therefore, the control device 32 can determine a bad product without dipping the optical transceiver 1 into the cooled coolant 63, when there is a large crack in the jointed portion of the ferrule 12 with a lens and the MT ferrule 13.

In the testing device of the embodiment, the whole of the optical transceiver 1 is dipped into the coolant 62. Thereby, the optical element 101 is dipped into the coolant 62. Therefore, when an abnormality occurs in the optical element 101 because of the heated coolant 64 or the cooled coolant 63, it is possible to determine the optical transceiver 1 as a bad product by detecting the optical power with use of the optical power meter 5. That is, it is possible to test the temperature characteristic of the optical element 101. Only the jointed portion of the ferrule 12 with a lens and the MT ferrule 13 in the optical transceiver 1 may be dipped into the coolant 62.

The testing device of the embodiment determines whether the optical transceiver 1 is good or bad, by detecting the light output from the optical transceiver 1. However, the testing device may determine whether the optical transceiver 1 is good or bad, by detecting the light entering the optical transceiver 1. In this case, a light source for emitting a light is connected to the connector 15 which is located at a front edge of the optical fiber 14. The light enters the optical fiber 14 and is output from the optical waveguide 11, in the jointed portion of the ferrule 12 with a lens and the MT ferrule 13. The substrate 42 for test has a function for determining whether the optical transceiver 1 normally receives the light from an electrical signal input from the optical element 101. That is, as an example of a detector, the substrate 42 for test detects the light output from the optical fiber 14.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A testing method for testing a jointed condition of a first ferrule holding an edge of an optical waveguide and a second ferrule holding an edge of an optical fiber, comprising:
dipping the first ferrule and the second ferrule that are jointed to each other into coolant so that the optical waveguide and the optical fiber are optically connected;
heating the coolant;
cooling the coolant after the heating;
inputting a light to one of the optical waveguide and the optical fiber after cooling the coolant, and detecting a light output from the other.

2. The testing method as claimed in claim 1, wherein the heating is performed before dipping the first ferrule and the second ferrule into the coolant.

3. The testing method as claimed in claim 1, further comprising:
inputting a light from one of the optical waveguide and the optical fiber, and detecting the light output from the other, before cooling the coolant.

4. The testing method as claimed in claim 1, wherein, in the dipping of the first ferrule and the second ferrule into the coolant, an inputting circuit for inputting a light to the optical waveguide and the optical fiber is dipped into the coolant.

5. A testing device for testing a jointed condition of a first ferrule holding an edge of an optical waveguide and a second ferrule holding an edge of an optical fiber, comprising:
a tank configured to house the first ferrule and the second ferrule which are jointed to each other so that the optical waveguide and the optical fiber are optically connected to each other;
a first storage tank configured to store heated coolant;
a second storage tank configured to store cooled coolant;
a first sender configured to send the coolant heated by the first storage tank, to the tank; and
a second sender configured to send the coolant cooled by the second storage tank, to the tank; and
a detector configured to detect a light output from one of the optical waveguide and the optical fiber,
wherein the first sender sends the heated coolant to the tank so that the first ferrule and the second ferrule are dipped into the heated coolant,
wherein the second sender sends the cooled coolant to the tank from the second storage tank so that the first ferrule and the second ferrule are dipped into the cooled coolant after the first ferrule and the second ferrule are dipped into the heated coolant,
wherein the detector is configured to detect a light output from one of the optical waveguide and the optical fiber after the first ferrule and the second ferrule are dipped into the cooled coolant.

6. The testing device as claimed in claim 5, wherein the detector is configured to detect a light that is input from one of the optical waveguide and the optical fiber and is output from the other, before the first ferrule and the second ferrule are dipped into the cooled coolant.

7. The testing device as claimed in claim 5, wherein the tank houses the first ferrule, the second ferrule and an inputting circuit for inputting a light to the optical waveguide and the optical fiber.

* * * * *